Oct. 5, 1943.  W. H. HARRISON  2,331,027
OPTICAL WEDGE
Filed Aug. 13, 1941
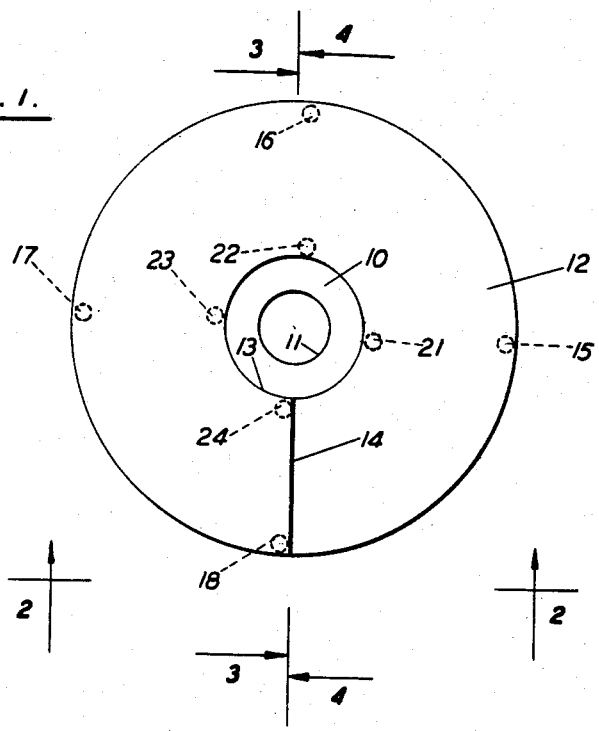
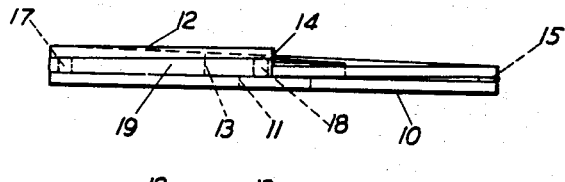
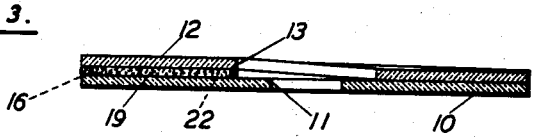
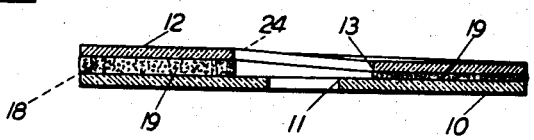
INVENTOR.
WILLIAM H. HARRISON
BY
ATTORNEY.

Patented Oct. 5, 1943

2,331,027

UNITED STATES PATENT OFFICE 2,331,027

OPTICAL WEDGE

William H. Harrison, Los Angeles, Calif.

Application August 13, 1941, Serial No. 406,585

11 Claims. (Cl. 88—108)

My invention relates generally to optical filters and more particularly to such filters whose density progressively varies from substantially clear to substantially opaque, such filters being known as optical wedges.

While optical wedges have been known and used for many years, their manufacture on a quantity basis has always presented some difficulty, and the manufacture of circular wedges, in which the density varies circumferentially around a disc, has been more difficult than the manufacture of straight wedges in which the density varies from one end of the wedge to the other. Filters have usually been made of a single piece of glass which contains the necessary coloring matter in itself, or have used a stained gelatine sheet preferably bonded between two covers of clear glass. The manufacture of wedges by either of these methods is obviously difficult, and it is to overcome these difficulties and to produce a new and superior type of wedge that I have developed the method and product described herein.

It is therefore a major object of my invention to provide an optical wedge and a method of making the same which is both simple and accurate, while at the same time permitting a relatively extended range of densities to be provided.

It is another object of my invention to provide such a wedge which lends itself to large scale production, and to provide a method whereby such wedges may be inexpensively produced in large quantities.

These and other objects of my invention will become apparent from the following description of a preferred form thereof and the method of making it, and from the drawing illustrating that form and method, in which Fig. 1 is a plan view of my improved filter;

Fig. 2 is an edge view of the filter taken at 2—2 in Fig. 1,

Fig. 3 is a cross-sectional view taken at 3—3 in Fig. 1, and

Fig. 4 is a cross-sectional view taken at 4—4 in Fig. 1.

Referring now to the drawing, the numeral 10 indicates a base or foundation plate of optically clear glass which preferably has a hole 11 through its center for ease of mounting. Held to the base plate 10 by a dyed cement 19 is a helical plate 12, likewise formed of optically clear glass and having a centrally located hole 13 from which a radial cut 14 extends.

It will be seen that if the base plate 10 is flat and if the split plate 12 is a true helix and their axes are aligned, a wedge-shaped space will be formed between the two plates, varying from a minimum on one side of the radial cut 14 to a maximum on the other. The helical plate 12 is most easily formed from a flat plate which has the hole 13 first cut in its center and the radial cut 14 then made. Because of the natural resilience of glass the plate 12 tends to remain flat and to form it into a helix, I place a series of spacers 15, 16, 17, and 18, and around the edge of one of the plates so that when the plates 10 and 12 are pressed together, the space between them will vary from substantially nothing on one side of the cut 14, to the maximum desired on the other side. By way of example only, and not as a limitation, in one form of my filter the spacers 15, 16, 17, and 18 have thicknesses of .0025, .0050, .0075, and .0100 inch respectively. and since they are placed substantially 90° apart, the space between the plates 10 and 12 increases in direct proportion to the circumferential distance from the cut 14.

The filter element of the combination is provided by a dye incorporated in a suitable material such as Canada balsam, for example, which is used as a cement 19 to hold the plates 10 and 12 together. The particular dye to be used is somewhat of a matter of personal choice, the characteristics needed being transparency as opposed to translucency, and generally that it be a truly neutral shade, transmitting all colors equally. This latter characteristic is particularly important when using the filter in color photography, since any inequality in color transmission will cause a falsification of the recorded color values, but it should be understood that the particular color of the dye may be changed to meet the requirements of special applications. The concentration of the dye in the cement will determine the opacity of a cement film of given thickness, and there are thus two ways of regulating the range of the filter: one, by varying the thickness of the spacers 15, 16, 17, and 18, and hence the thickness of the cement 19; and two, by varying the concentration of the dye within the cement. Both methods may be combined, of course, and hence a large number of filter ranges may be provided, but it must be remembered that too great a range cannot be secured merely by using thicker spacers, since at some point the ultimate strength of the glass will be passed, and fracture will result.

Once the concentration of dye has been selected, the thickness of the cement film 19 determines the density of the filter at any particular point, and it will be apparent that the smoother the facing surfaces of the plates 10 and 12, the more uniform the density will be. For this reason, and also to reduce optical aberrations to a minimum, the two plates should be as smooth as possible. It should be noted, however, that the plate 12 is in the form of a helix, which means that it will be a warped plane, and hence when thicker spacers 15, 16, 17, and 18 are used, there may be a tendency for the inner edges of the helix 12 to be spaced a different distance from the base plate 10 than the outer edges, thus causing a radial variation in the density of the filter. When it is necessary to overcome this, I prefer to use additional spacers 21, 22, 23, and 24, having the same thickness as the spacers 15, 16, 17, and 18, respectively, and located radially inwardly from the latter. Both sets of spacers are normally located outside the field of view of the device in which the filter is used, but if for any reason it is impossible to locate them in this manner, the spacers of either or both groups may be made of a material which has the same light transmission characteristics as an equal amount of cement, and thus the spacers will not be noticeable. Normally, of course, it is much simpler to make the filter slightly larger, but where this cannot be done, the optional method just described is very advantageous.

In the manufacture of the filter, two smooth plates of glass are selected, and a hole 11 is formed in the plate to be used as the base plate 10, and similarly a hole 13 is formed in the plate which is to become the helical plate 12. After the hole 13 is formed, the radially extending cut 14 is made, the hole serving as a very convenient inner terminus for the cut and eliminating the need for accurately ending it at the center of the disc. The hole 13 also makes it possible to warp the disc into a helix with a minimum of stress, and thus the possibility of breakage of the completed filter is considerably reduced.

When the holes 11 and 13 have been formed and the cut 14 has been made, the spacers 15, 16, 17, 18, 21, 22, 23, and 24 are positioned, the cement 19 is applied, and the plates 10 and 12 are placed together. A tool is then pressed against the helical plate 12 and moved around the latter so that all excess cement is forced from between the plates 10 and 12 and their separation is determined by the spacers 15, 16, 17, 18, 21, 22, 23, and 24 alone. As an alternative to the use of the smaller tool, a resilient or complementally shaped die may be used to force the plate 12 against the plate 10, but unless a large number of filters having the same size spacers are to be made, the expense of a special die is usually not warranted. With either method, however, as soon as the cement 19 has cooled and set, the discs 10 and 12 are firmly bonded together and all that remains to be done is to remove any cement which may be adhering to the edges. The completed filter may be used wherever a circular optical wedge is desired by mounting it on a shaft or spindle which passes through the holes 11 and 13. Some of these applications include visual exposure meters of the extinction type, certain color meters, densitometers, and faders for causing one scene of a motion picture to fade out and/or another scene to fade in.

It will thus be seen that my invention is fully capable of achieving the objects and advantages set forth, and while I have shown and described a preferred form and method, I do not wish to be limited to the particular form or sequence of steps herein set forth, except as limited by the following claims.

I claim as my invention:

1. An optical wedge of the character described which includes: a base plate having a centrally located hole therein; a helical plate separate from said base plate and having a centrally located hole therein with a radial cut extending therefrom; a series of circumferentially separated spacers of differing thickness located between said base plate and said helical plate; a second set of spacers located radially inwardly from said first spacers and of corresponding thickness; and a dyed solid cement bonding said base plate and said helical plate together and having a thickness determined by the thickness of said spacers whereby the thickness of said cement determines the light transmissive properties of said wedge and a filter of substantially uniformly varying opacity is had.

2. An optical wedge of the character described which includes: a transparent base plate having a centrally located hole therein; a transparent helical plate separate from said base plate and having a centrally located hole therein with a radial cut extending therefrom; a series of angularly separated spacers of differing thickness located between said base plate and said helical plate; and a dyed solid cement bonding said base plate and said helical plate together and forming a wedge-shaped filter member of substantially uniformly varying opacity.

3. An optical wedge of the character described which includes: a transparent glass base plate having a centrally located hole therein; a transparent glass helical plate separate from said base plate and having a centrally located hole therein with a radial cut extending therefrom; a series of angularly separated spacers of differing thickness located between said base plate and said helical plate; and a dyed solid cement bonding said base plate and said helical plate together and forming a wedge-shaped filter member of substantially uniformly varying opacity.

4. The method of making an optical wedge which includes: forming an axially located hole in a flat transparent plate; forming a radial cut extending from said hole to the edge of said plate; locating spacers between said plate and a second flat transparent plate whereby said first plate is caused to assume a helical shape upon the application of pressure; and bonding said first and second plates together with a thermosetting dyed cement to hold said first plate in its helical shape.

5. The method of making an optical wedge which includes: forming an axially located hole in a transparent glass plate; forming a radial cut extending from said hole to the edge of said plate; locating spacers between said plate and a second transparent glass plate whereby said first plate is caused to assume a helical shape upon the application of pressure; and bonding said first and second plates together with a thermosetting dyed cement to hold said first plate in its helical shape.

6. An optical wedge adapted to be mounted for rotation, which includes: a flat transparent base plate; a transparent helical plate spaced from said base plate and separate therefrom; and a layer of solid cement filling the space between said plates and bonding them together, the perimetral edge of said bonding layer being unconfined by either of said plates.

7. An optical wedge adapted to be mounted for rotation, which includes: a flat transparent base plate; and a transparent helical plate spaced from said base plate and bonded thereto solely by a layer of solid cement which is unconfined by either of said plates, said layer of cement being of progressively varying thickness circumferentially, to completely fill the helical space between said plates.

8. An optical wedge adapted to be mounted for rotation, which includes: a flat transparent base plate; and a transparent helical plate spaced from said base plate by a plurality of spacers of varying thickness and bonded thereto by a layer of solid cement of varying thickness, said helical plate being under stress and tending to assume a flat condition.

9. An optical wedge adapted to be mounted for rotation, which includes: a flat transparent base plate; a second transparent plate having a centrally located hole therein and a radial cut extending outwardly therefrom, said plates being separate and spaced from each other by a plurality of spacers arranged in a curved path, said spacers being of progressively increasing thickness to thereby form a curved wedge-shaped space between said plates; and a layer of cement filling the space between said plates to bond them together and to thereby hold said second plate in a stressed helical position.

10. The method of making an optical wedge adapted to be mounted for rotation, which includes: placing spacers of varying thickness on a flat plate, said spacers forming a curved path about the approximate center of said plate; applying a layer of solid setting cement to one face of said plate; forming a plate with a hole therein and a radial cut extending therefrom to the edge of said plate; placing said second plate over said cement and said spacers; applying pressure to said plates to warp said second plate into a helical shape and form said cement into a curved wedge; and maintaining said pressure until said cement sets to a solid.

11. The method of making an optical wedge adapted to be mounted for rotation, which includes: placing spacers of varying thickness on a flat glass plate, said spacers forming a curved path about the approximate center of said plate; applying a layer of dyed viscous material adapted to set up solid to one face of said plate; placing a glass plate having a hole near its center and a radial cut extending therefrom over said viscous material and said spacers; applying pressure on said plates to warp said second glass plate into a helical shape; and maintaining said pressure until said viscous material sets to a solid.

WILLIAM H. HARRISON.